Patented Sept. 14, 1926.

1,600,072

UNITED STATES PATENT OFFICE.

FRANZ SKAUPY AND GEORG GAIDIES, OF BERLIN, GERMANY, ASSIGNORS TO GENERAL ELECTRIC COMPANY, A CORPORATION OF NEW YORK.

LIGHT-DIFFUSING GLASSWARE AND METHOD OF MAKING IT.

No Drawing. Application filed March 31, 1925, Serial No. 19,706, and in Germany July 9, 1924.

Light diffusing glassware is usually made of clear glass which is subsequently rendered opaque or is provided with a cloudy coating. Frequently such glassware, as for example, incandescent lamp bulbs, is made of opal glass. These methods of making such glassware either do not give the desired degree of diffusion or they are relatively difficult of execution. In the method forming the subject of this invention, these disadvantages are avoided.

In accordance with this invention there is applied to the hollow glassware, which may be clear or opaque depending on circumstances, a coating of light diffusing cloudy enamel such as is commonly used in the ceramic industry, and usually white, but which may be colored. This coating must be very thin, as the glassware is exposed to great variations in temperature. In order to attain a good light diffusion it is necessary to add to the enamel a liberal addition of a clouding medium such as that used in the ceramic industry for making opal glaze. Such cloudy enamels do not, however, give smooth surfaces when melted or burned in. In accordance with this invention there is applied to the primary layer of strongly clouded enamel on the clear glassware a second easily fusible layer, which consists of an enamel, either colorless or colored, and which is of such a composition that after it is fused or burned in it has a smooth surface. This second layer can likewise have added to it a clouding medium, but of course only to such a degree that the obtaining of a smooth surface when the second layer is melted is not hindered. When using a colored second or surface layer there is obtained, as distinguished from the usual single layers of enamel which are both colored and simultaneously clouded, the advantage that the light absorption in the colored layer is kept within very low limits, as there cannot occur repeated reflections in the colored layer.

The manufacture of the glassware can be carried out in the usual manner, and the two layers may be consecutively applied by any of the well known methods. For example, the layers of glaze or enamel may be applied to the glass by squirting the glaze onto the glass, or by dipping the glassware into a paste of the glaze, or the layers may be burned in together, or after the application of the first layer it may be burned in and then the second one is applied and burned in.

The invention is applicable to any kind of hollow glassware which is used for diffusing light, but is particularly useful in connection with bulbs for incandescent lamps and other light sources of high intrinsic brilliancy.

What we claim as new and desire to secure by Letters Patent of the United States is:—

1. The method of making light diffusing hollow glassware which consists in shaping the glassware from clear glass, applying to the glassware a layer of clouded enamel, and superposing upon said clouded layer a layer of different enamel having a smooth surface when fused.

2. The method of making light diffusing hollow glassware which consists in forming a hollow body of clear glass, enameling said body with a clouded enamel, and superposing upon said enameled body a layer of colored enamel having a smooth outer surface when fused.

3. Hollow light diffusing glassware comprising a hollow body of clear glass, a layer of clouded enamel fused to said body and a layer of different enamel superposed upon the clouded enamel and having a smooth surface when fused.

4. A glass envelope for an electric lamp consisting of a clear glass bulb having thereon a two layer coat of enamel, the layer adjoining the bulb being composed of a cloudy enamel, and the outer layer of an enamel which gives a smooth surface when fused.

In witness whereof, we have hereunto set our hands this 16th day of March, 1925.

FRANZ SKAUPY.
GEORG GAIDIES.